United States Patent
Pfeufer et al.

(10) Patent No.: US 7,418,316 B2
(45) Date of Patent: Aug. 26, 2008

(54) METHOD AND DEVICE FOR CONTROLLING OPERATIONAL PROCESSES, ESPECIALLY IN A VEHICLE

(75) Inventors: Reinhard Pfeufer, Moeglingen (DE); Margit Mueller, Asperg (DE); Wolfgang Haag, Winnenden (DE); Stefan Keller, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 568 days.

(21) Appl. No.: 10/523,327

(22) PCT Filed: Jul. 10, 2003

(86) PCT No.: PCT/DE03/02310

§ 371 (c)(1),
(2), (4) Date: Sep. 8, 2005

(87) PCT Pub. No.: WO2004/021095

PCT Pub. Date: Mar. 11, 2004

(65) Prior Publication Data

US 2006/0112315 A1    May 25, 2006

(30) Foreign Application Priority Data

Aug. 7, 2004   (DE) ............................... 102 36 080

(51) Int. Cl.
G05B 19/418   (2006.01)
G06F 19/00    (2006.01)

(52) U.S. Cl. ............................... 701/1; 701/29; 701/34; 702/185

(58) Field of Classification Search ............ 701/1, 701/29, 33, 34, 35, 36, 108; 702/185; 307/10.1
See application file for complete search history.

(56) References Cited

U.S. PATENT DOCUMENTS

| 4,255,789 | A  | * | 3/1981 | Hartford et al. ............. 701/108 |
| 5,357,518 | A  |   | 10/1994 | Peter |
| 5,600,782 | A  |   | 2/1997 | Thomson |
| 6,115,831 | A  |   | 9/2000 | Hanf et al. |
| 2002/0077782 | A1 | * | 6/2002 | Fruehling et al. ............ 702/185 |
| 2002/0080026 | A1 |   | 6/2002 | Wagner et al. |

FOREIGN PATENT DOCUMENTS

| DE | 198 33 462 | 1/2000 |
| DE | 100 30 996 | 1/2002 |
| EP | 1 069 733 | 1/2001 |

* cited by examiner

*Primary Examiner*—Tan Q Nguyen
(74) *Attorney, Agent, or Firm*—Kenyon & Kenyon LLP

(57) ABSTRACT

The present invention provides a method and a device for controlling operational sequences, in particular in a vehicle. In this context, a functional unit for forwarding and receiving data via at least one connecting unit is in contact with at least one bus system. Functional unit is monitored by a monitoring unit. The monitoring unit prevents the forwarding of data by the functional unit via the at least one bus system if the monitoring unit detects an error of the functional unit. In an error case, in order to prevent the forwarding of data by functional unit in a manner as simple as possible, yet one that is safe and reliable, an error signal is emitted by the monitoring unit, which error signal assumes different values as a function of whether an error of the functional unit has been recognized or not, and the error signal is applied to the at least one connecting unit such that the at least one connecting unit is deactivated by the error signal if an error of the functional unit has been detected.

15 Claims, 3 Drawing Sheets

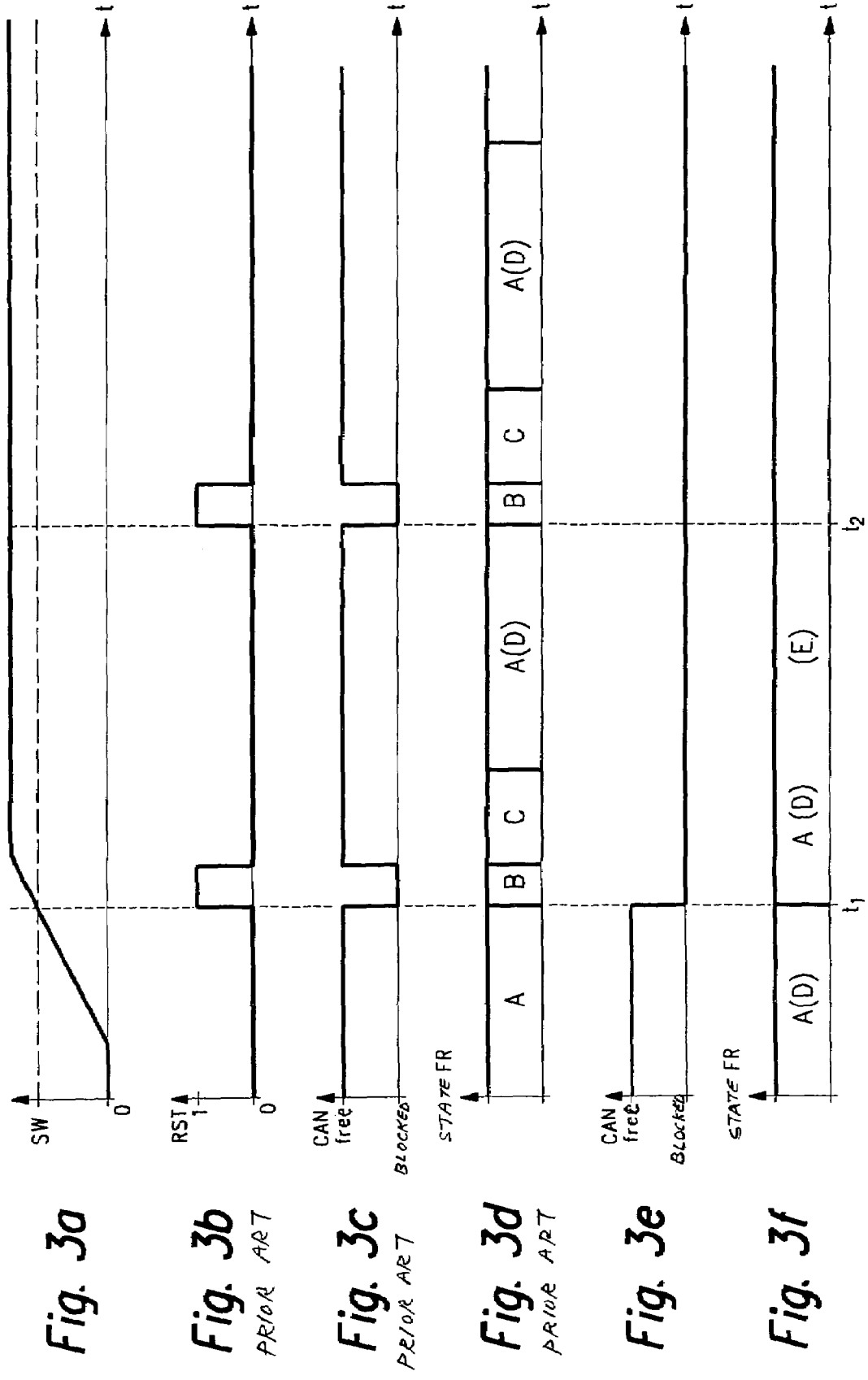

METHOD AND DEVICE FOR CONTROLLING OPERATIONAL PROCESSES, ESPECIALLY IN A VEHICLE

FIELD OF THE INVENTION

The present invention relates to a device and a method for controlling and/or regulating operational sequences, particularly in a motor vehicle, in which a functional unit for forwarding and receiving data via at least one connecting unit is in contact with at least one bus system.

BACKGROUND INFORMATION

A circuit configuration for decoupling an electronic device from a data line in a motor vehicle is described, e.g., in published German patent document DE 198 33 462. The electronic device and at least one additional electrical system exchange data via the data line, during the operation of the electronic device. In the case of the circuit configuration where vehicle operation can be maintained despite a malfunction of an electronic device connected to the data line, the electronic device is connected to a fault detection device. In response to the fault detection device ascertaining a fault of the electronic device, the electronic device is decoupled from the data line by the circuit configuration, the serviceability of the electronic system being maintained.

In published German patent document DE 198 33 462 the important aspect is the monitoring of the data line and the detection of errors in the data line, which could impair the operability of the electronic device that is connected to the data line. The error detection device is switched into the data line for decoupling the electronic device from the data line in the error case, and it includes electrical switching elements so as to be able to cut off the data line in case of error. That assumes, however, that in each data line to which the electronic device is connected and which is supposed to be cut off in the error case, switching elements have to be situated.

Published German patent document DE 100 30 996 describes an arrangement in which the functional monitoring of the functional unit by the monitoring unit is able to be activated or deactivated by the functional unit, using a switching element. The switching element is able to be implemented by the setting or deleting of a bit. During an activated monitoring function, the functional unit is disconnected from the bus system by an access. For this, the monitoring unit activates an additional switching element, by which the connection of the functional unit to the bus system is interrupted. Here too, it has proven problematical that likewise separate switching elements have to be provided in the connection between the functional unit and the bus system, so that the functional unit is able to be decoupled from the bus system in the error case.

In addition, from the prior art, monitoring concepts for functional units are known, e.g., for motor vehicle control units, in which the monitoring unit triggers a reset in the error case. As a result of the reset, the functional unit runs up and thereafter attains its operational state. If the error of the functional unit continues to exist, the monitoring unit detects the error only in the newly operational state, and only then does it trigger again a reset of the functional unit. The forwarding of data by the functional unit via the bus system is only prevented for a short period of time during the reset state, since only in this state are the input/output connection positions (so-called ports) of the functional unit inactive. Thus, in the known method, a faulty functional unit may possibly forward faulty data via the bus system, even though the monitoring unit has detected an error of the functional unit. This may lead to safety-relevant situations in the control of the operational sequences.

An object of the present invention is to provide preventing of the forwarding of data by the functional unit via the bus system safely, reliably and in a simple manner.

SUMMARY

The present invention provides that an error signal is emitted by the monitoring unit that assumes different values as a function of whether an error of the functional unit has been detected or not, and that the error signal is applied at the at least one connecting unit, and the at least one connecting unit is deactivated by the applied error signal if an error of the functional unit has been detected.

In the method according to the present invention, no reset is triggered by the monitoring unit in response to a detected error, but rather a connecting unit that is situated between the functional unit and the bus system is simply switched off. The connecting unit is developed, for example, as a signal amplification device, e.g., as a bus driver circuit of the bus system (so-called bus driver). The bus driver is used, e.g., for amplifying a bus signal generated by bus control (so-called bus controller), before it is transmitted via the bus system, as well as for signal conditioning that is free of retrospective effect. Thus, according to the present invention, the functional unit per se remains in an operable state and is still able to generate data. However, these data are no longer able to be transmitted via the bus system, since the connecting unit required for the forwarding of data has been deactivated.

By the use of the method according to the present invention, the impairment of other functional units, which are in contact via the bus system with the faulty functional unit, is prevented in a simple manner. Consequently, in the error case, an erroneous functional unit is not able to forward any potentially faulty or undesired data via the bus system. This results in intrinsically safe individual systems in an integrated network.

It is advantageous that the forwarding of data by the functional unit may be prevented safely and reliably, without the use of additional switching elements between the functional unit and the bus system or in the bus system itself. In addition, using the present invention, the forwarding of data by the functional unit may be prevented indefinitely, which has the advantage compared to the reset of the functional unit that the faulty functional unit is not able to forward data via the bus system. To the extent that the errors of the functional unit permit it, the latter still works quite normally, i.e., it still generates data for controlling and/or regulating the operational sequences, these data, however, possibly being erroneous. However, these data are not able to be transmitted via the bus system. By permitting further operation of the functional unit, it is possible to continue to monitor the functional unit, even in the error case, and once again permit the forwarding of data by the functional unit as soon as the error of the functional unit no longer occurs.

The reason for the need to prevent the forwarding of data by the functional unit in the error case is that an erroneous functional unit may no longer have control over itself and over the correct generation of data to be sent, and because of its own error it is also not able to switch itself off reliably and safely. Because of a defective functional unit in an integrated network, in which several functional units are in contact with one another via a bus system, there is a danger that the remaining receiving functional units on the bus system may receive erroneous data from the erroneously forwarding functional unit, and thus prompted, carry out unwanted actions. These actions triggered by erroneous data may also have a safety-relevant effect on the operational sequences that are to be controlled. Taking the example of motor vehicle control units, a control unit for the internal combustion engine could, in the error case, for example, cause a transmission control unit to shift down into lower gears, whereby the vehicle could arrive at an unstable travel state.

According to one example embodiment of the present invention, it is provided that the error signal is applied to a reset input of the at least one connecting unit. In case of an error, the connecting unit is able to be deactivated by the error signal present at the reset input.

According to one example embodiment of the present invention, it is provided that the functional unit is in contact with several bus systems and that the error signal is applied to connecting units of several of the bus systems. The advantage of the present invention, that the forwarding of data by an erroneous functional unit is able to be prevented safely and reliably without the use of additional hardware, such as, for instance, additional switching elements for interrupting the connection between erroneous functional unit and bus system, is especially useful when the erroneous functional unit is in contact not only with one but with several bus systems, via which data are able to be sent to other functional units. In all bus systems that are connected to the erroneous functional unit and which are to be deactivated in case of an error, the error signal of the monitoring unit is conducted to the connecting units. Bus systems which are only used for transmitting data of non-safety-relevant operational sequences (e.g., of comfort functions), do not necessarily have to be switched off in case of an error of the functional unit.

Furthermore, according to an example embodiment of the present invention, it is provided that the error signal be applied at the outputs of components whose operational sequences are controlled or regulated by the erroneous functional unit. These components are, for example, outputs of the ignition, the fuel injection and/or the throttle valve of an internal combustion engine. The aim of this measure is to bring the internal combustion engine safely to a stop, in case of an error in the controlling or regulating functional unit.

It may be advantageous that, after the detection of an error of the functional unit, the functional unit continues to be monitored by the monitoring unit, and the at least one connecting unit is activated again in case a proper function of the functional unit is detected. This renewed activation of the connecting units is possible at any time in the present invention. In contrast, in the prior art, in which, in case of an error, a reset of the erroneous functional unit is executed, a proper functioning of the functional unit could only be detected subsequent to the reset and the running up of the functional unit. Consequently, using the present invention, one may improve not only the safety of an integrated network which includes several functional units that are in contact with one another via a bus system, but also the availability of the integrated network, since the proper functioning of a functional unit may be detected particularly rapidly.

The monitoring unit has means for forming and emitting an error signal which assumes different values as a function of whether or not the monitoring unit has detected an error of the functional unit, and that the error signal is conducted to the at least one connecting unit and that the at least one connecting unit should be able to be deactivated by the error signal that is present, if the error of the functional unit was detected. The device corresponds, for example, to an integrated network that includes several functional units which are in contact with one another via a bus system.

According to one embodiment of the present invention, it is provided that the error signal is applied to an enable/disable input of the at least one connecting unit. Alternatively, it is provided that the error signal be conducted to a reset input of the at least one connecting unit.

The device advantageously includes several functional units which are connected to one another via a bus system, and at least one monitoring unit, the monitoring unit preventing the forwarding of data by a functional unit via the at least one bus system, in case the monitoring unit has detected an error of this functional unit. Such a device corresponds to the so-called multi-control unit concept that has increasingly been used in motor vehicles recently, in which several control units are put in in parallel to one another to increase computational performance, the individual control units each controlling a certain part of the operational sequences. Thus, for example, in a two-control unit concept for controlling an 8-cylinder internal combustion engine, a first control unit is put in for controlling four of the cylinders and a second control unit for controlling the remaining four cylinders. The two control units are in contact with each other via a bus system. Data concerning the operational state of the internal combustion engine or of the motor vehicle are only supplied to the first control unit, which then passes the data on to the second control unit via the bus system. If the monitoring unit of the first control unit detects an error of the control unit, it deactivates the connecting unit of the bus system to the second control unit, so as to prevent the first control unit from forwarding erroneous data to the second control unit and having the second control unit controlling the remaining four cylinders of the internal combustion engine in a faulty manner and even possibly having a safety-relevant situation coming about.

Finally, as still another example embodiment of the present invention, it is provided that the monitoring unit has means for forming and emitting an error signal which assumes different values as a function of whether or not the monitoring unit has detected an error of the functional unit, and that the error signal is conducted to the at least one connecting unit and that the at least one connecting unit is able to be deactivated by the error signal that is present, if the error of the functional unit was detected.

BRIEF DESCRIPTION OF THE DRAWINGS

FIG. 3a shows a time curve of the state of an error counter of monitoring module.

FIGS. 3b-3d show the curves of various states and signals of a conventional control unit.

FIGS. 3e-3f show the curves of various states and signals of the control unit according to the present invention.

DETAILED DESCRIPTION

Figure 1:
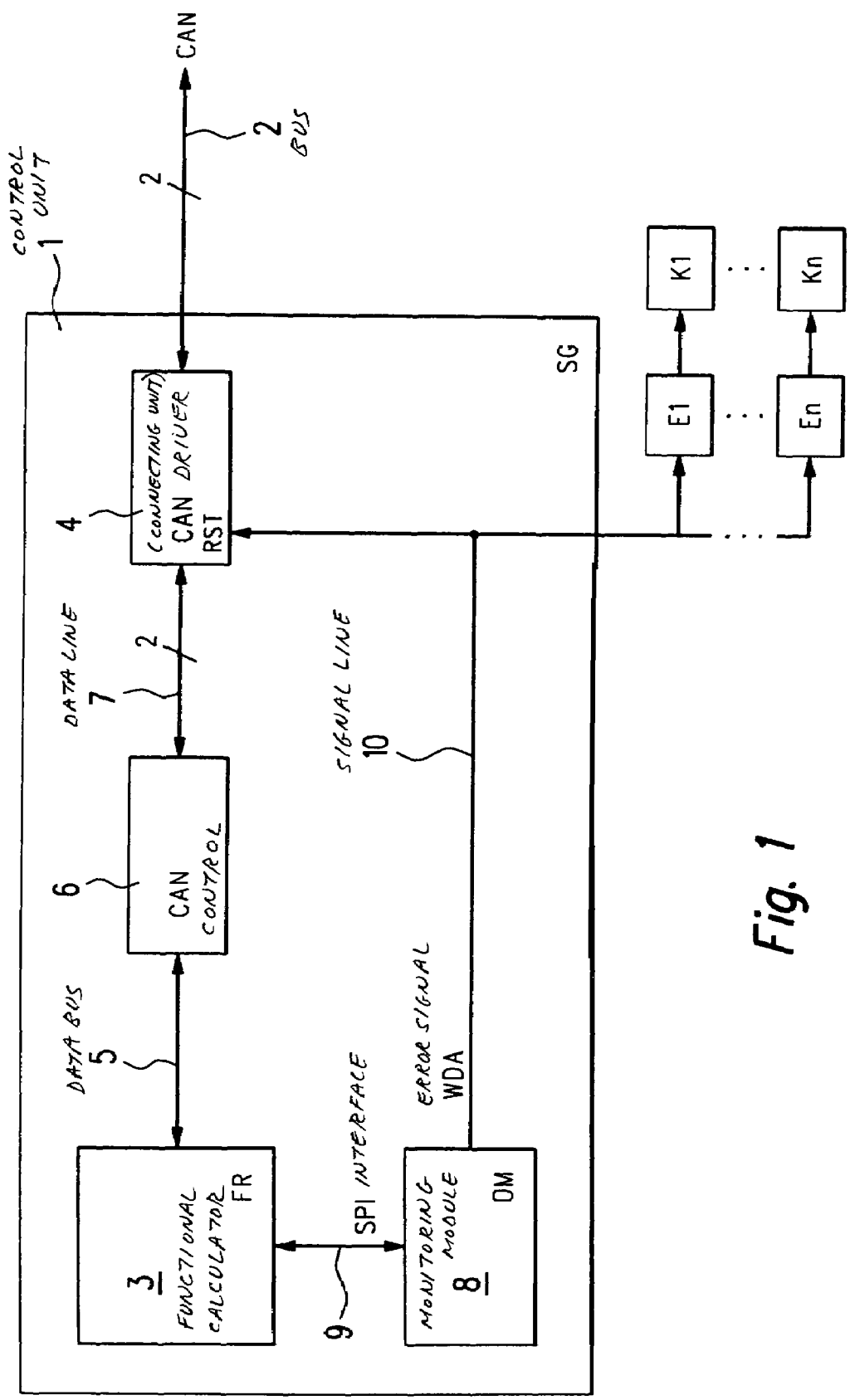
FIG. 1 shows an example embodiment of a control unit of the present invention.

In FIG. 1, a control unit SG according to the present invention is designated in its entirety by reference numeral 1. Control unit 1 is used, for example, for controlling and/or regulating operational sequences in a motor vehicle. Subsequently, we will go into more detail, for example, on a control unit 1 for controlling of operational sequences in an internal combustion engine of a motor vehicle. However, the present invention is generally applicable to all types of control units SG, such as for transmission control, vehicle dynamics control, drive slip control (ASR), an automatic distance control (EDC; electronic distance control), adaptive cruise control (ACC), etc, which control units are in contact with one another via a bus system 2 to an integrated control unit system, and which exchange data among one another via bus system 2. Bus system 2 is, for instance, developed as a CAN (controller area network).

Control unit 1 includes a functional calculator FR 3 which is designed, for instance, as a microprocessor or as a microcontroller. A computer program is able to be run on functional calculator 3 which is used to carry out the control and/or regulating function of control unit 1. Functional calculator 3 is in contact with bus system 2 via connecting unit 4, for forwarding and receiving data. Connecting unit 4 is designed as a hardware interface between a controller and an external control unit monitoring bus having a signal amplification device, especially as a bus driver circuit, e.g. as a CAN driver for a CAN bus system, i.e., connecting unit 4 is also designated as CAN driver.

The data generated in functional calculator 3 within the scope of executing the computer program to fulfill the control and/or regulating function of control unit 1 are first transmitted to a CAN control 6 via a data bus 5, which is also designated as CAN controller. In CAN control 6, the data generated by functional calculator 3 are put into a format corresponding to the CAN protocol, und are prepared for transmission via CAN bus system 2. Before transmission of the processed data, the signals have to be adapted to the electrical properties on the CAN bus. For this purpose, the processed data are transmitted via a two-wire data line 7 from CAN control 6 to CAN driver 4, which puts the signals on CAN bus system 2.

Independent hardware for functional monitoring functional calculator 3 is assigned to functional calculator 3. The independent hardware is designated as monitoring module ÜM 8. Monitoring module 8 cyclically poses various questions to functional calculator 3, which run through voluminous control mechanisms, such as program sequence controls or command tests in functional calculator 3, and form a result. The result is transmitted back to monitoring module 8 as a response to the question. A functional calculator working error-free supplies back the correct response within a predefined time window. Monitoring module 8 determines by evaluating the response whether an error of functional calculator 3 has occurred or not. The monitoring of functional calculator 3 by monitoring module 8 is also designated as inquiry-response communication. The communication between monitoring module 8 and functional calculator 2 takes place via an SPI (serial parallel interface) interface 9.

By evaluating the response of functional calculator 3, an error signal WDA is generated in monitoring module 8, which assumes different values as a function of whether an error of functional calculator 3 was detected or not. Preferably, an error counter is incremented if an error of functional calculator 3 is detected.

Error signal WDA is emitted only when the error counter has exceeded a threshold value. Error signal WDA is applied, via a signal line 10, to outputs E1 to EN of motor vehicle components K1 to Kn, which are activated by control unit 1 for controlling and/or regulating the operating sequences. In a motor vehicle control unit 1 for controlling and/or regulating an internal combustion engine, these are, for example, the outputs for ignition, fuel injection and/or throttle valve. The activation of outputs E1 to En using error signal WDA is for the purpose, in case of error, to bring the internal combustion engine safely to a standstill and to avoid safety-relevant situations.

According to the present invention, error signal WDA is also applied to a reset input RST of CAN driver 4. CAN driver 4 is deactivated by the error signal that is present in case an error of functional calculator 3 was detected. Thereby the forwarding of data by a defective functional calculator 3 via CAN bus system 2 is prevented reliably, effectively and, above all, durably for the entire duration of the error of the functional calculator. Thereby, also, the forwarding of possibly erroneous information by erroneous functional calculator 3 via CAN bus system 2 to other functional calculators is prevented in a simple manner. Consequently, control unit 1 according to the present invention represents an intrinsically safe individual system in a composite control unit system. It satisfies the rules for control units in a composite control unit system, namely that each control unit 1 itself bears the responsibility for the data forwarded by it.

An additional advantage of the present invention is that an erroneous functional calculator 3 continues to operate normally and continues to ascertain data, albeit some possibly erroneous, for controlling the operating sequences. Monitoring module 8 is thus able to continue to monitor the operability of functional calculator 3 even after detecting an error of functional calculator 3. As long as monitoring module 8 detects an error of functional calculator 3, CAN driver 4 remains deactivated so that the erroneous date ascertained by erroneous functional calculator 3 do not get onto CAN bus system 2 and are able to impair other functional calculators of the composite control unit system. However, as soon as monitoring module 8 detects a proper functioning of functional calculator 2, CAN driver 4 may be activated again, so that control unit 1 is able to operate quite normally again. In the present invention, it is advantageous that a proper functioning of functional calculator 3 is able to be detected without a long time delay.

Another advantage of the present invention may be seen in that the forwarding of data by an erroneous functional calculator 3 may be prevented in a simple manner and without additional hardware, for example, without additional circuit elements that are put into the CAN bus system and are opened in the error case in order to separate functional calculator 3 from CAN bus system 2.

Figure 2:
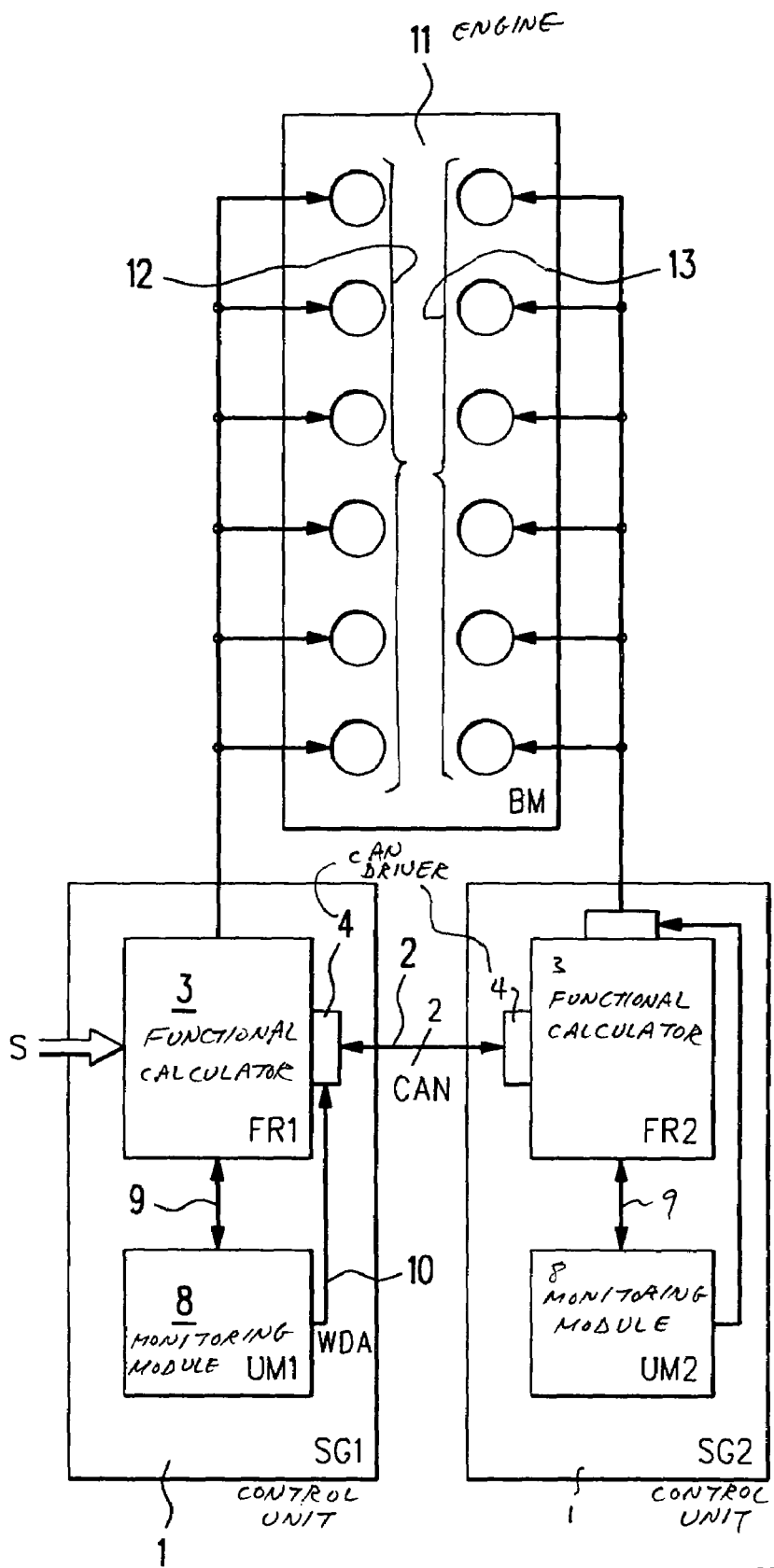
FIG. 2 shows an example embodiment of a device according to the present invention, including two control units according to the present invention, which are in contact with one another via a bus system.

In FIG. 2 a multi-control unit concept, more accurately a two-control unit concept, is shown in which two control units SG1 and SG2 for controlling certain operating sequences are used. In the exemplary embodiment shown, the two control units SG1, SG2 for controlling the operating sequences in a 12-cylinder internal combustion engine BM 11 are used. In this context, first control unit SG1 controls the first six cylinders ZYL 12 and the second control unit SG2 controls the remaining six cylinders ZYL 13. First control unit SGl receives data S via driver command (setting of the gas pedal) and/or via the operating state of internal combustion engine 11 and of the motor vehicle from corresponding sensors. Control units SGl and SG2 are connected to each other via a CAN bus system 2. Second control unit SG2 receives setpoint inputs (e.g. the driver's command) from first control unit SG1, via CAN bus system 2. In case of an error of functional calculator FR1 of first control unit SG1, in order to avoid erroneous setpoint inputs being transmitted to second control unit SG2, according to the present invention, the forwarding of data by functional calculator FR1 via CAN bus system 2 is prevented by monitoring module ÜM1. To do this, error signal WDA of monitoring module ÜM1 is applied to a reset input RST of CAN driver 4.

With the aid of the data transmission that fails to materialize (message interruption, or rather no up-dating), control unit SG2 is able to detect a defect in SG1, and to activate corresponding substitute measures or error reactions in SG2.

FIGS. 3a to 3f show curves of various control unit states and control unit variables plotted against time t. In particular, FIG. 3a shows the state of an error counter of monitoring module 8. At the beginning, this rises from zero to above a threshold value SW. As soon as the error counter exceeds threshold value SW, an error reaction is triggered at time $t_1$. That means that error signal WDA assumes a corresponding value. As values of error signal WDA, HIGH and LOW are especially applicable.

The curves shown in FIGS. 3b, 3c and 3d correspond to the prior art. FIG. 3b shows the curve of a reset signal which, according to the prior art, is applied by monitoring module ÜM 8 to a reset input of functional calculator FR 3. At time $t_1$ the error reaction is triggered which, according to the prior art, consists in triggering a reset of functional calculator FR 3. FIG. 3c shows the curve of a quantity "CAN signal released". The signal has the values "free" or "blocked". From FIG. 3c one may see that the CAN signal is only blocked during the reset (RST=1 in FIG. 3b) and is otherwise free. As long as CAN signal is released, even an erroneous functional calculator FR 3 may possibly transmit erroneous data via CAN bus system 2. Under certain circumstances, this may trigger erroneous reactions in other functional calculators FR of the composite control unit system.

FIG. 3d shows various states of control unit SG that is known from the prior art. Before triggering the error reaction at time $t_1$, control unit SG runs through a quite normal travel program A. Thereafter, a reset state B follows after time $t_1$. Subsequently, control unit SG runs an initializing phase C, and then in turn changes into normal travel program A. During travel program A, monitoring module ÜM carries out an inquiry-response communication with functional calculator FR that is to be monitored, and detects at time $t_2$ that the error of functional calculator FR is still there. Thereafter, the system runs afresh through the above-described states reset B, initializing C and travel program A with inquiry-response communication D.

FIGS. 3e and 3f show the signal curves and state curves of control unit 1 according to the present invention. In FIG. 3e one may clearly recognize that the CAN signal is blocked for the duration of the error directly after the error reaction at time $t_1$. After the error reaction, functional calculator 3 is in a quite normal travel program A, during which an inquiry-response communication D is cyclically executed, and the outputs via the WDA signal are in a deactivated state (E). However, the data ascertained by functional calculator 3 are not transmitted via CAN bus system 2, since CAN driver 4 has been deactivated and consequently the CAN signal is blocked. In the present invention, in the error case, functional calculator 3 is never in a situation in which the operability of functional calculator 3 could not be checked by an inquiry-response communication. By contrast, in the prior art, in the error case, checking the operability of functional calculator 3 could not take place during the states reset B and initializing C. It is for this reason that the proper functioning of functional calculator 3 is detected earlier in the case of the present invention than with the related art.

What is claimed is:

1. A method for controlling operational sequences of at least one component of a vehicle, comprising:
    monitoring a functional unit by a monitoring unit, the functional unit transmitting and receiving data through at least one connecting unit that is in contact with at least one bus system;
    emitting an error signal having a first value by the monitoring unit if an error of the functional unit has been detected, the error signal having a value different from the first value if an error of the functional unit has not been detected; and
    applying the error signal having the first value to the at least one connecting unit to deactivate the at least one connecting unit if an error of the functional unit has been detected, whereby the transmitting of data by the functional unit through the at least one bus system is prevented.

2. The method as recited in claim 1, wherein the error signal is applied to a reset input of the at least one connecting unit.

3. The method as recited in claim 2, wherein the functional unit is in contact with a plurality of bus systems, and wherein the error signal is applied to connecting units of the plurality of the bus systems.

4. The method as recited in claim 2, wherein the error signal is applied to an output of the at least one component whose operating sequences are controlled.

5. The method as recited claim 4, further comprising:
    continuing to monitor the functional unit by the monitoring unit after the detection of an error of the functional unit; and
    activating again the at least one connecting unit if a proper functioning of the functional unit has been detected.

6. The method as recited claim 2, further comprising:
    continuing to monitor the functional unit by the monitoring unit after the detection of an error of the functional unit; and
    activating again the at least one connecting unit if a proper functioning of the functional unit has been detected.

7. The method as recited in claim 2, further comprising:
    not resetting the functional unit after the detection of an error of the functional unit, wherein the functional unit continues operation.

8. The method as recited in claim 1, wherein the error signal is applied to an output of the at least one component whose operating sequences are controlled.

9. The method as recited in claim 1, further comprising:
    continuing to monitor the functional unit by the monitoring unit after the detection of an error of the functional unit; and
    activating again the at least one connecting unit if a proper functioning of the functional unit has been detected.

10. A device for controlling operational sequences of at least one component of a vehicle, comprising:
    at least one functional unit for transmitting and receiving data through at least one connecting unit that is in contact with at least one bus system; and
    at least one monitoring unit for monitoring the functional unit, the monitoring unit generating an error signal having a first value if an error of the functional unit has been detected, the error signal having a value different from the first value if an error of the functional unit has not been detected, wherein the error signal having the first value is applied to the at least one connecting unit to deactivate the at least one connecting unit if an error of the functional unit has been detected, whereby the transmitting of data by the functional unit through the at least one bus system is prevented.

11. The device as recited in claim 10, wherein the error signal is applied to an enable/disable input of the at least one connecting unit.

12. The device as recited in claim 11, wherein the device includes a plurality of functional units that are linked to one another through the at least one bus system, and wherein the monitoring unit prevents the transmitting of data of a particular functional unit through the at least one bus system if the monitoring unit has detected an error of the particular functional unit.

13. The device as recited in claim 10, wherein the error signal is applied to a reset input of the at least one connecting unit.

14. The device as recited in claim 13, wherein the device includes a plurality of functional units that are linked to one another through the at least one bus system, and wherein the monitoring unit prevents the transmitting of data of a particular functional unit through the at least one bus system if the monitoring unit has detected an error of the particular functional unit.

15. The device as recited in claim 10, wherein the device includes a plurality of functional units that are linked to one another through the at least one bus system, and wherein the monitoring unit prevents the transmitting of data of a particular functional unit through the at least one bus system if the monitoring unit has detected an error of the particular functional unit.

* * * * *